(14.)
K. H. LOOMIS.
Improvement in Devices for Locking Nuts.
No. 122,900.     *Fig. 1.*     Patented Jan. 23, 1872.
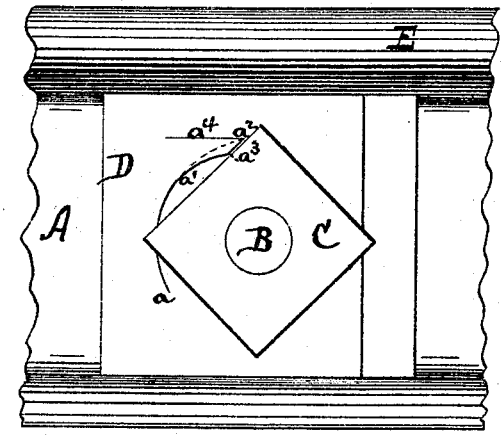
*Fig. 2.*
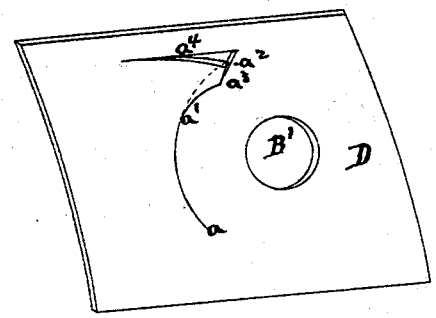
Witnesses:
Henry N. Miller
C. L. Evert
Inventor
Kellogg H. Loomis
per Alexander Mason
Attorneys.

UNITED STATES PATENT OFFICE.

KELLOGG H. LOOMIS, OF NEW YORK, N. Y.

IMPROVEMENT IN DEVICES FOR LOCKING NUTS.

Specification forming part of Letters Patent No. 122,900, dated January 23, 1872.

*To all whom it may concern:*

Be it known that I, KELLOGG H. LOOMIS, of New York city, county, and State, have invented certain new and useful Improvements in Nut-Locks; and do hereby declare that the following is a full, clear, and exact description thereof, reference being had to the annexed drawing making a part of this specification, in which—

Figure 1 represents a side view of the nut and washer connecting the fish piece to a railroad rail, and Fig. 2 represents a perspective view of my spring washer.

Like letters of reference indicate like parts.

The nature and object of my invention is to produce a simple, cheap, and efficient device for locking nuts on bolts, the construction and operation of which will be more fully hereinafter described.

In the annexed drawing, A represent a fish piece connected to the side of a railroad rail, E. On the exterior of the fish-plate is placed the metallic spring washer D. Through the rail, fish-plate, and washer is passed an ordinary bolt, B, through an orifice in said rail, fish-plate, and B′ in the washer. C represents an ordinary nut screwed on the bolt outside of the spring washer D. Upon one side of the washer (which is made of a rectangular plate of spring-steel or similar material) a suitable distance from the orifice to correspond with the size of the nut to be used, a cut is made in the washer, combining the concentric, eccentric, oblique, and straight, as shown, the concentric being from $a$ to $a^1$, the eccentric being from $a^1$ to $a^2$, the oblique being from $a^2$ to $a^3$ downward from the orifice B′, and the straight being from $a^2$ to $a^4$ from the nut.

It will be seen that the cut is so made with respect to the nut that the outer corners of the nut will overlap the cut, and that the oblique point formed in the washer will form a bearing against the side thereof, as shown in Fig. 1 of the drawing, so as to prevent the nut from being unscrewed until the bearing point is depressed to conform to the surface of the main portion of the plate. The object in making the peculiar cut $a$, $a^1$, $a^2$, $a^3$, and $a^4$ is: First, to cause an outward spring bearing in the spring washer within the washer itself. Second, to allow one of the corners of the polygonal-shaped nut to be at all times bearing over the nut when it is screwed on the bolt. Third, to shorten the tension of the spring ($a^2$ to $a^3$) point, which bears against the side of the nut, so as to make it strong and perfect to prevent the vibration of the spring and to prevent its cracking at the base of the cut, and to cause the outer end ($a^2$ $a^3$) to not protrude too far for the free revolution of the nut. Without the straight cut the point of contact $a^2$ to $a^3$ could not be formed, unless the spring should be made more full by an outer-curved cut in a line with the inner-curved cut, as hereinbefore referred to.

It will be seen that the nut C is screwed onto the bolt outside of the washer until it is perfectly tight, when it is left with one side in the oblique position shown in Fig. 1, with one corner resting over the cut where it is concentric, while the other (upper) corner, nearest the same, lies beyond the point of contact of the spring washer, so that the nut cannot be made to take a backward turn without depressing this point of the spring.

I am aware that a spring washer provided with various-shaped cuts to distend a part of the washer and secure the nut from unturning is not new. I am also aware that the combination of a spring washer having a circular cut ending with a vertical cut to engage within a ratchet formed in a recessed nut, which entirely covers the circular cut, has been known. My invention differs from these in the fact that the nut is revolved on the cut in the washer without the aid of other than the pressure of the nut on cut which forms the spring bearing, and is held in an oblique position on the washer, and in the fact that the nut can readily be disengaged from the washer by pressing upon the exposed spring bearing point.

Having thus fully described my invention, what I claim as new, and desire to secure by Letters Patent, is—

The combination, with an ordinary bolt and an ordinary nut, of the metallic spring washer D, provided with the orifice B′ and the combined concentric, eccentric, oblique, and straight cuts $a$, $a^1$, $a^2$, $a^3$, and $a^4$, all substantially as and for the purposes set forth.

KELLOGG H. LOOMIS.

Witnesses:
J. J. GREENOUGH,
E. JOHNSON.